United States Patent [19]

Hilfman et al.

[11] Patent Number: 4,501,655
[45] Date of Patent: Feb. 26, 1985

[54] HYDROCRACKING PROCESS

[75] Inventors: Lee Hilfman; Mark J. O'Hara, both of Mount Prospect, Ill.

[73] Assignee: UOP Inc., Des Plaines, Ill.

[21] Appl. No.: 595,113

[22] Filed: Mar. 30, 1984

Related U.S. Application Data

[62] Division of Ser. No. 526,235, Aug. 25, 1983, Pat. No. 4,464,481.

[51] Int. Cl.³ .................... C10G 47/04; C10G 47/20
[52] U.S. Cl. .................... 208/110; 208/111; 208/115
[58] Field of Search .............. 208/110, 115, 109, 112, 208/111; 502/228, 229, 300, 259

[56] References Cited

U.S. PATENT DOCUMENTS

| | | | |
|---|---|---|---|
| 3,159,569 | 12/1964 | Hansford | 208/110 |
| 3,349,025 | 10/1967 | Henke et al. | 208/110 |
| 4,301,032 | 11/1981 | Atkinson et al. | 582/337 |
| 4,367,164 | 1/1983 | Shiroto et al. | 502/84 |
| 4,420,388 | 12/1983 | Bertolacini | 208/112 |
| 4,464,481 | 8/1984 | Hilfman et al. | 502/259 |

Primary Examiner—Delbert E. Gantz
Assistant Examiner—A. McFarlane
Attorney, Agent, or Firm—James R. Hoatson, Jr.; Louis A. Morris; William H. Page, II

[57] ABSTRACT

A process is provided for the hydrocracking of a hydrocarbon charge stock which comprises reacting the charge stock with hydrogen at hydrocracking conversion conditions in contact with a catalytic composite comprising a combination of a Group VIB metal component, Group VIII metal component, and a fluorine component present in an amount ranging from 1 to 3 wt. %, on an elemental basis, based on the composite, with a silica-thoria carrier material wherein the carrier is cogelled silica-thoria consisting of from about 25% to about 99% by weight silica and from 1% to about 75% by weight thoria.

A hydrocracking catalyst is also provided which comprises a combination of a nickel component, a tungsten component, and a fluorine component with a silica-thoria carrier material. The nickel, tungsten, and fluorine components are present in amounts sufficient to result in the composite containing, on an elemental basis, about 0.5 to about 2 wt. % of the nickel component, about 0.5 to about 14 wt. % of the tungsten component, and about 1 to about 3 wt. % of the fluorine component.

Another hydrocracking catalyst is provided which comprises a silica-thoria-alumina carrier material wherein the carrier material comprises from about 25 to about 99 wt. % silica, from about 1 to about 75 wt. % thoria, and from about 1 to about 25 wt. % alumina.

4 Claims, No Drawings

HYDROCRACKING PROCESS

CROSS-REFERENCE TO RELATED APPLICATION

This application is a division of our prior copending application Ser. No. 526,235, filed Aug. 25, 1983, now U.S. Pat. No. 4,464,481, the teachings of which are hereby expressly incorporated by reference thereto.

BACKGROUND OF THE INVENTION

1. Field of the Invention

The field of art to which this invention pertains is the catalytic hydrocracking of hydrocarbons. This invention also relates to hydrocarbon conversion catalysts and their methods of manufacture. The catalyst composite of the present invention demonstrates unexpected and exceptional activity, selectivity and resistance to deactivation when employed in a hydrocracking conversion process.

2. Description of the Background Information

The hydrocracking of hydrocarbons by catalytic means is old and well known in the prior art. Hydrocracking of hydrocarbon oil, which may be high-boiling fractions, such as, for example, reduced crudes, gas oils, topped crudes, shale oil, coal extract and tar sand extract, generally is performed at relatively high temperatures and pressures of the order to 500° F. and 500 psig and upward. Catalysts for the hydrocracking of hydrocarbons are generally moderate to strong hydrogenation catalysts.

The prior art hydrocracking catalysts will typically comprise one or more components selected from silica, alumina, silica-alumina, crystalline aluminosilicate, or other refractory inorganic oxide and at least one metal component from Group VIB or Group VIII. One or more hydrogenation components have been selected by the prior art to serve as the hydrogenation component in hydroconversion catalysts. The prior art has broadly taught that hydrogenation components may be selected from at least one of the following metals: iron, cobalt, nickel, ruthenium, rhodium, palladium, osmium, iridium, platinum, chromium, molybdenum, tungsten, vanadium, niobium, and tantalum. See, for instance, U.S. Pat. Nos. 3,442,821 (Hilfman), 3,931,048 (Hilfman), and 4,040,979 (Gembicki et al.) which all disclose the use of silica-alumina carrier materials in connection with the hydrocracking process.

U.S. Pat. No. 2,270,812, Melaven, discloses a cracking catalyst (catalytic cracking in contradistinction to hydrocracking) consisting of a silica gel which has a thorium compound absorbed upon it in a layer not more than one molecule thick. The cracking process disclosed in that patent is preferably carried out at atmospheric pressure and may be carried out at 100 to 200 psig.

U.S. Pat. No. 2,723,243, Holden, discloses a cogelled silicametal oxide catalyst primarily useful for cracking reactions. The metal oxides that may be composited with the silica include those of aluminum, magnesium, zirconium, beryllium, vanadium, thorium, and tantalum. The cracking reactions contemplated in that patent are carried out at 700° to 1200° F. and a pressure of from atmospheric to 1000 psig or more.

U.S. Pat. No. 2,532,497, Hoekstra, likewise discloses silicametal oxide composites that are particularly suitable for catalytic cracking reactions, which generally are effected at a temperature of from about 800° to about 1100° F. at superatmospheric pressures ranging from atmospheric to about 50 pounds or more per square inch. Catalytic dehydrogenation is generally effected at a temperature of from about 900° to about 1200° F., either in the presence or absence of hydrogen and generally at pressures below 100 pounds per square inch. Reforming of gasoline to improve its antiknock properties is generally effected at temperatures within this range but at pressures of from about 100 to 500 pounds per square inch.

The present invention involves the discovery that the use of a particular cogelled silica-thoria catalyst comprising nickel and tungsten exhibits improved and unexpected hydrocracking conversion characteristics, such as, activity and selectivity, and stability.

SUMMARY OF THE INVENTION

The invention is, in one embodiment, a process for the hydrocracking of a hydrocarbon charge stock which comprises reacting the charge stock with hydrogen at hydrocarbon hydrocracking conversion conditions in contact with a catalytic composite comprising a combination of a Group VIB metal component, Group VIII metal component and a fluorine component present in an amount ranging from 1 to 3 wt. %, on an elemental basis, based on the composite, with a silica-thoria carrier material wherein the carrier is cogelled silica-thoria consisting of from about 25% to about 99% by weight silica and from about 1% to about 75% by weight thoria. The Group VIB metal component and the Group VIII metal component are present in the composite, on an elemental basis, ranging from about 0.5 to about 14 wt. % and from about 0.5 to about 2 wt. %, respectively. Further, the hydrocracking conditions include a temperature range from about 500° to about 1000° F., a pressure from about 500 to about 3000 psig, a liquid hourly space velocity from about 0.2 to about 15 and a hydrogen circulation rate from about 500 to about 20,000 standard cubic feet per barrel of hydrocarbon charge.

In another embodiment, the present invention pertains to a hydrocracking catalyst composite comprising a combination of a nickel component, a tungsten component, and a fluorine component with a silica-thoria carrier material as described above. The nickel, tungsten, and fluorine components are present in amounts sufficient to result in the composite containing, on an elemental basis, about 0.5 to about 2 wt. % of the nickel component, about 0.5 to about 14 wt. % of the tungsten component and about 1 to about 3 wt. % of the fluorine component.

A further embodiment of the present invention pertains to a hydrocracking catalyst composite comprising a nickel component, a tungsten component, and a fluorine component with a silica-thoria-alumina carrier material wherein the carrier material comprises from about 25 to about 99 wt. % silica, from about 1 to about 75 wt. % thoria, and from about 1 to about 25 wt. % alumina. The nickel, tungsten, and fluorine components are present in the composite containing, on an elemental basis, about 0.5 to about 2 wt. % of the nickel component, about 0.5 to about 14 wt. % of the tungsten component, and about 1 to about 3 wt. % of the fluorine component.

DETAILED DESCRIPTION OF THE INVENTION

The hydrocarbon charge stock subject to hydrocracking in accordance with the process of this invention is suitably a petroleum fraction boiling in the range from about 200° to about 1200° F. Pursuant to the present process, the hydrocarbon charge stock is reacted with hydrogen at hydrocracking conditions which may include a hydrogen pressure from about 500 psig to about 3000 psig and a temperature from about 500° to about 1000° F.

Petroleum hydrocarbon fractions which can be utilized as charge stocks thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 200° to about 1200° F. or it aay consist of any one, or a number of petroleum hydrocarbon fractions, such as are set out above, which distill over within the 200°-200° F. range. Suitable hydrocarbon feedstocks also include hydrocarbons derived from tar sand, oil shale and coal.

Since the petroleum hydrocarbons and other hydrocarbons as well which are hydrocracked according to the process of this invention boil over a considerably wide range, it may be readily perceived that suitable reaction temperatures will lie within a correspondingly wide range, the preferred temperature ranges depending in each instance upon the particular petroleum hydrocarbon fraction utilized as a charge stock. For example, reaction temperatures from about 500° to about 1000° F. are generally operable. However, where the particular petroleum hydrocarbon fraction utilized boils within the range from about 700° to about 900° F., it is preferred to operate at reaction temperatures in the more restricted range from about 500° to about 800° F.

Pursuant to the present invention and as hereinabove mentioned, hydrogen is reacted with the hydrocarbon charge stock preferably at a pressure from about 500 psig to about 3000 psig. The hydrogen circulation rate is preferably from about 500 standard cubic feet to about 20,000 standard cubic feet per barrel of charge stock, although amounts of from about 200 standard cubic feet to as much as 30,000 standard cubic feet per barrel are operable. The liquid hourly space velocity of the petroleum hydrocarbon charge stock is preferably from about 0.2 to about 15 depending on the particular charge employed and the reaction temperatures necessitated thereby. A suitable correlation between space velocity and reaction temperature can be readily determined by one skilled in the art in any particular instance. When utilizing a charge stock boiling in the range from about 700° to about 900° F., a liquid hourly space velocity from about 1 to about 3 is preferred.

It should be pointed out that the hydrocracking process of the present invention is distinct from the catalytic cracking processes disclosed in U.S. Pat. Nos. 2,270,812, and 2,532,497. Hydrocracking is carried out at a substantially higher pressure than catalytic cracking and in the presence of hydrogen. In particular, the process of the present invention as mentioned above is carried out at a pressure of from 500 psig to 3000 psig.

The cracking process in U.S. Pat. No. 2,270,812 is carried out at relatively low pressures, preferably atmospheric to 50 psig, although pressures of 100 to 200 psig may also be used. There is no mention of the presence of hydrogen.

U.S. Pat. No. 2,723,243 likewise discloses a cracking process which can be carried out at from atmospheric to 1000 psig or more and a temperature of from 700° to about 1200° F. The subject patent is silent with respect to the use of hydrogen in connection with the cracking process. This silence with respect to the presence of hydrogen and the fact that the patent's issue date predates the advent of the modern hydrocracking process leads one to believe that the patent is not concerned with the hydrocracking process. The process of the present invention in contradistinction requires the presence of hydrogen.

Finally, U.S. Pat. No. 2,532,497 likewise does not disclose the process of the present invention as the pressures employed are less than 500 psig. The silica-metal oxide of the present patent can be employed in a catalytic dehydrogenation reaction effected in the presence of hydrogen at pressures below 100 psig. The cracking process can be carried out at a pressure of from atmospheric to 50 psig or more. Again these pressures are too low to effect the hydrocracking process of the present invention employing a catalyst comprising a silica-thoria carrier.

One of the components of the catalyst of the present invention is a cogelled silica-thoria carrier material. The silica-thoria composite utilized herein is synthetically prepared and is considered to function as a catalytic element of the final catalyst composite as well as the carrier for the nickel and tungsten metallic components thereof to give a final catalyst composite having surprising and unexpected properties with respect to the hydrocracking of hydrocarbons as herein contemplated. In accordance with the present invention, the cogelled silica-thoria composite comprises from about 25% to about 99% by weight silica and from about 1% to about 75% by weight thoria.

The cogelled silica-thoria composite is suitably prepared as spheroidal particles by the well known oil drop method. In a preferred method of manufacture, aqueous $Th(NO_3)_4.4H_2O$, utilized as a thoria source, is commingled with an acidified water glass solution as a silica source, and the mixture is further commingled with a suitable gelling agent, for example, urea, hexamethylenetetramine (HMT), or mixtures thereof. The mixture is discharged while still below gelation temperature, and by means of a nozzle or rotating disk, into a hot oil bath maintained at gelation temperature. The mixture is dispersed into the oil bath as droplets which form into spherical gel particles during passage therethrough.

The spheroidal gel particles prepared by the oil-drop method are aged, usually in the oil bath, for a period of at least 10-16 hours, and then in a suitable alkaline or basic medium for at least 3 to about 10 hours, and finally water washed. Proper gelation of the mixture in the oil bath, as well as subsequent aging of the gel spheres, is not readily accomplished below about 120° F., and at about 210° F., the rapid evolution of the gases tend to rupture and otherwise weaken the spheres. By maintaining sufficient superatmospheric pressure during the forming and aging steps in order to maintain water in the liquid phase, a higher temperature may be employed, frequently with improved results. If the gel particles are aged at superatmospheric pressure, no alkaline aging step is required.

The spheres are water-washed, preferably with water containing a small amount of ammonium hydroxide and/or ammonium nitrate. After washing, the spheres are dried, at a temperature from about 200° to about 600° F. for a period from about 6 to about 24 hours or more, and then calcined at a temperature from about 800° to about 1400° F. for a period from about 2 to about 12 hours or more.

The cogelled silica-thoria composite may also be prepared by a method whereby acidified sodium silicate is added to $Th(NO_3)_4.4H_2O$. This admixture is further commingled with a precipitating agent such as $NH_4OH$ or a urea solution. The precipitate is then aged for a period of at least 10 to 16 hours in a suitable basic medium at about 95° C. After the aging step the precipitate is slurried with water containing $NH_4NO_3$ and/or $NH_4OH$ at about 90° C. This slurry is dried and comminuted to a powder passing a particle size less than 30 mesh. The subject powder is then washed in a dilute $NH_4NO_3/NH_4OH$ solution and dried. Subsequently the powder is commingled with an extrusion aid such as starch or kaolin clay and extruded. The extrudate is then dried and calcined.

In one aspect of the present invention, the extrusion aid employed is alumina. The use of alumina as an extrusion aid results in the preparation of a catalyst possessing an unexpectedly high hydrocracking activity. The amount of alumina extrusion aid employed generally varies from 1 to 25 wt. % of the total silica-thoria-alumina extrudate. 12 wt. % alumina is the preferred amount.

The above described extrusion mixture may also be admixed with a peptizing agent and sufficient water to provide a mixture characterized by a weight loss on ignition at 900° C. of from about 50 to about 70%, and preferably from about 55 to about 65%. The peptizing agent is suitably a weak acid such as formic acid, acetic acid, propionic acid, and the like, although strong acids, for example, sulfuric acid, hydrochloric acid, and especially nitric acid, are preferable. Typically, the peptizing agent will be admixed with the finely divided refractory inorganic oxide as an aqueous solution thereof to provide at least a portion of the required water content of the mixture.

The extrusion operation is suitably effected with a commercial extrusion apparatus. For example, the dough is continuously processed through a cylinder by means of a rotating screw, and pressured through a perforated plate at one end of the cylinder. The extrudate may be cut into particles of desired length prior to drying and calcining by means of a rotating knife as the extrudate emerges from the perforated plate. Alternatively, the extrudate may be broken into particles of random length during the drying and calcining process. In any case, the extrudate is dried and calcined, drying being usually accomplished at a temperature up to about 120° C. over a 1–24 hour period, and calcining being preferably effected in an oxidizing atmosphere such as air at a temperature of from about 315° to about 650° C. over a period of from about 2 to about 4 hours.

In another aspect of the present invention the hydrocracking catalyst comprising silica-thoria also contains from 1.0 to 3.0 wt. % fluorine. The fluorine component, it is believed, is in a combined state with the porous support material. Preferably the fluorine component is also well dispersed throughout the catalyst composite. Preferably the catalytic composite contains about 2 wt. % fluorine.

The fluorine component may be added to the catalytic composite comprising silica-thoria in any suitable manner, either during the preparation of the support or before, while or after the catalyst components are incorporated. For example, the fluorine component may be impregnated upon the silica-thoria support. Suitable compounds that contain fluorine include, but are not limited to, hydrofluoric acid, ammonium fluoride, ammonium bifluoride, fluosilicic acid, fluosulfonic acid. The addition of fluorine to catalyst of the invention markedly increases the hydrocracking activity of the catalyst.

Other essential components of the catalyst of the present invention are a Group VIB metal component and a Group VIII metal component which may be composited with the cogelled silica-thoria, or the extruded silica-thoria-alumina carrier material by any suitable coimpregnation technique. Thus, the carrier material can be soaked, dipped, suspended, or otherwise immersed in an aqueous impregnating solution containing a soluble nickel salt and a soluble tungsten salt. One suitable method comprises immersing the carrier material in the impregnating solution and evaporating the same to dryness in a rotary steam dryer, the concentration of the impregnating solution being such as to ensure a final catalyst composition comprising, on an elemental basis, from about 0.5% to about 2% by weight nickel and from about 0.5% to about 14% by weight tungsten. Another suitable method comprises dipping the carrier material into the aqueous impregnating solution at room temperature until complete penetration of the carrier by the solution is achieved. After absorption of the impregnating solution, the carrier is drained of free surface liquid and dried in a moving belt calciner.

The resulting catalyst composite is usually dried at a temperature from about 200° to about 500° F. for a period from about 1 to about 10 hours prior to calcination. In accordance with the present invention, calcination is effected in an oxidizing atmosphere at a temperature from about 700° to about 1200° F. The oxidizing atmosphere is suitably air, although other gases comprising molecular oxygen may be employed.

Following the high temperature oxidation procedure, the catalyst is usually reduced for a period from about 0.5 to about 10 hours at a temperature in the range from about 700° to about 1000° F. in the presence of hydrogen. The catalyst may also be used in the sulfide form. If a sulfided catalyst is preferred, the reduced catalyst may then be subject to sulfidation by passing hydrogen sulfide, or other suitable sulfur containing compound, in contact therewith, preferably at an elevated temperature from about 500° to about 1100° F. The reduced catalyst is preferably sulfided by contacting the catalyst with a stream of hydrogen containing from about 1 to about 20 percent or more by volume of hydrogen sulfide at elevated temperature from about 500° to about 1100° F. When the petroleum hydrocarbon to be hydrocracked contains sulfur compounds, by design or otherwise, sulfidation may be suitably effected in situ during the initial stage of the hydrocracking process.

The catalyst composite is preferably employed in a reaction zone as a fixed bed. The hydrocarbon charge stock after being combined with hydrogen in an amount of from about 500 to about 20,000 standard cubic feet per barrel, is introduced into the reaction zone. The charge stock may be in a liquid, vapor, or liquid-vapor phase mixture, depending upon the temperature, pressure, proportion of hydrogen and the boiling range of the charge stock being processed. The liquid hourly space velocity through the reaction zone will be in excess of about 0.2 and generally in the range of from about 1.0 to about 15.0 based on fresh feed. The source of hydrogen being admixed with a hydrocarbon charge stock may comprise a hydrogen-rich gas stream which is withdrawn from a high-pressure, low-temperature separation zone and recycled to supply at least a portion of such hydrogen. Excess hydrogen resulting from the various dehydrogenation reactions effected in a catalytic reforming unit may also be employed in admixture with the hydrocarbon charge. The reaction zone will operate under an imposed pressure within the range of from about 80 to about 3000 pounds per square inch gauge. The catalyst bed inlet temperature is maintained within the range of from about 350° to about 800° F. Since the hydrocracking reactions are exothermic, the outlet temperature or the temperature at the bottom of the catalyst bed will be significantly higher than that at the inlet thereto. The degree of exothermicity exhibited by the temperature rise across the catalyst bed is at least partially dependent upon the character of the charge stock passing therethrough, the rate at which the normally liquid hydrocarbon charge contacts the catalyst bed, the intended degree of conversion to lower-boiling hydrocarbon products, etc. In any event, the catalyst bed inlet temperature will be such that the exothermicity of the reactions taking place does not cause the temperature at the outlet of the bed to exceed about 900° F., and preferably 850° F. The operation may also be effected as a moving-bed type of operation in which the catalyst, hydrocarbon and hydrogen are admixed and passed as a slurry through the reaction zone.

Although the method of preparing the catalyst, and careful selection of operating conditions within the ranges hereinbefore set forth, extend the effective life of the catalyst composite, regeneration thereof may eventually become desired due to the natural deterioration of the catalytically active metallic components. The catalytic composite is readily regenerated by treating the same in an oxidizing atmosphere, at a temperature of from about 750° to about 850° F., and burning coke and other heavy hydrocarbonaceous material therefrom. The catalyst composite may then be subjected to the reducing action in hydrogen, in situ, at a temperature within the range of from about 1000° to about 1200° F. If desirable, the catalyst may then be sulfided in the same manner as fresh catalyst as hereinbefore described.

EXAMPLE I

This Example describes the preparation and testing of a commercially available silica-alumina-nickel-tungsten catalyst as well as the silica-thoria-nickel-tungsten-fluorine catalyst of the present invention.

The catalyst of the present invention, hereinafter referred to as Catalyst "A", was prepared in accordance with the present invention and contained a 77/23 silica-thoria cogelled carrier material with 0.6 wt. % nickel, 6.0 wt. % tungsten and 2 wt. % fluorine.

The prior art catalyst, hereinafter referred to as Catalyst "B", was a commercially available catalyst and contained a 50/50 silicaalumina cogelled carrier material with 0.6 wt. % nickel and 0.6 wt. % tungsten. The cogelled silica-alumina carrier material was prepared by the hereinabove described oil-drop method. The only difference between the two catalysts was that Catalyst "A" contained the silicathoria carrier and was impregnated with fluorine, and Catalyst "B" contained the prior art silica-alumina carrier. Each batch of cogelled carrier material was impregnated with an aqueous solution of nickel nitrate and ammonium metatungstate. The impregnation solutions were prepared to yield the desired nickel and tungsten levels on the finished catalysts. The impregnated spheres of each catalyst were dried and then calcined at a temperature of 1100° F.

Both Catalyst "A" and Catalyst "B" were separately tested for the hydrocracking of a vacuum gas oil whose properties are summarized in Table I.

TABLE I

| Properties of Vacuum Gas Oil | |
|---|---|
| API° 60° F. | 21.6 |
| Sp. Gr. | 0.9242 |
| IBP °F. | 441 |
| % Over °F. | |
| 5 | 571 |
| 10 | 619 |
| 20 | 668 |
| 30 | 705 |
| 40 | 733 |
| 50 | 758 |
| 60 | 780 |
| 70 | 805 |
| 80 | 840 |
| 90 | 886 |
| 95 | 921 |
| E.P. °F. | 959 |
| % Sulfur | 3.01 |
| % Nitrogen | 0.12 |
| % Hydrogen | 12.41 |
| % Carbon | 84.34 |
| % Oxygen | 0.13 |
| % C7 Insoluble | 0.06 |
| % Con-Carbon | 0.11 |
| Mol. Wt. | 354 |
| Pour Point | +65° F. |
| Visc. (Kin.) 100° F. | |
| CST | 33.02 |
| SUS | 155.1 |
| % Aromatics | 56.4 |
| % Non-Aromatics | 43.6 |

In each case, the vacuum gas oil was processed with a reaction zone pressure of 2000 psig, a liquid hourly space velocity of 0.8 based on fresh feed, a combined feed ratio of 1.5, a hydrogen circulation rate of 10,000 SCFB and a catalyst bed temperature which was required to produce 100% conversion to 650° F. endpoint product.

The following Table summarizes the results obtained from the tests.

TABLE II

| | Catalyst A | Catalyst B |
|---|---|---|
| Activity °F. | 759 | 770 |
| Deactivation Rate, °F./BBL/LB | 57 | 23 |
| Wt. % Yield C7-650° F. | 94.1 | 91.0 |
| C5/C6 | 1.4 | 3.6 |
| C1-C4 | 3.4 | 4.2 |

While the deactivation rate of the invention Catalyst "A" is greater than that of the reference Catalyst "B" the activity and yield characteristics of the invention catalyst are superior. The highly favorable yield and activity characteristics of the present invention catalyst more than offset the unfavorable deactivation rate in comparison to the reference catalyst. Wt. % yield is defined as the weight of a particular product fraction as a percentage of the weight of the feed input. A greater amount of the desirable $C_7$–650° F. product is produced at the expense of the undesirable light $C_1$–$C_4$ product. The deactivation rate is defined as the rate at which the temperature of the reaction zone must be increased in order to maintain conversion to 650° F.-product. The activity is indicated by the initial temperature at which the reaction zone achieves the desired conversion. The activity for the catalyst of the invention "A" is substantially greater than that of Catalyst "B".

EXAMPLE II

The present Example serves to show the effect of fluorine addition upon the activity, yield and stability characteristics in comparison to the reference commercial catalyst. Also shown is the effect of alumina as an extrusion aid upon the activity of the hydrocracking catalysts.

Catalysts "C", "D", and "E" contained 68 wt. % $SiO_2$, 20 wt. % $ThO_2$ and 12 wt. % $Al_2O_3$. These catalysts were prepared by adding sodium silicate to an HCl solution containing thorium nitrate. $SiO_2$ and $ThO_2$ was then precipitated by the addition of the above admixture to a $NH_4OH$ solution. The final pH of the $NH_4OH$ solution was 8.4. The gelatinous precipitate was then aged for 16 hours at 95° C. followed by 3 washings with dilute ammonium nitrate solution containing ammonium hydroxide. The gelatinous precipitate was thereafter dried. The dried gelatinous precipitate was then passed through a 30 mesh screen and then reslurried in ammonium nitrate solution containing ammonium hydroxide. This reslurrying procedure was repeated 5 times in order to decrease sodium content of the precipitate below 0.1 wt. %. The powder was then extruded with CATAPAL® alumina, starch and kaolin clay into 1/16 inch extrudates. The extrudates were dried and calcined at 1100° F. in an air atmosphere. The calcined extrudates were then impregnated in the usual manner, as described above, to yield a final extrudate containing 0.6 wt. % nickel and 6.0 wt. % tungsten. Catalyst "C" was further impregnated to yield a catalytic composite containing 2 wt. % fluorine. Catalyst "D" was also further impregnated to yield a final catalytic composite containing 4 wt. % fluorine. Catalyst "E" contained no fluorine. Catalyst "F" identifies the reference commercially available hydrocracking catalyst.

Vacuum gas oil hydrocracking tests were conducted with the catalysts under the same processing conditions discussed in Example I above and the same gas oil. The following Table summarizes the results of these tests.

TABLE III

|  | C | D | E | F |
|---|---|---|---|---|
| Activity °F. | 754 | 757 | 772 | 772 |
| Wt. % F | 2 | 4 | 0 | 0 |
| Deactivation Rate °F./BBL/LB | 33 | 67 | 51 | 23 |
| Wt. % Yield $C_7$–650° F. | 91.9 | 92.5 | 92.6 | 91.0 |
| $C_5/C_6$ | 2.5 | 1.0 | 2.4 | 3.6 |
| $C_1$–$C_4$ | 5.1 | 5.4 | 4.8 | 4.2 |

An inspection of Table III shows that an optimum amount of fluoride, about 2 wt. %, provides the invention Catalyst "C" with a significant 18° F. advantage in activity over the reference Catalyst "F". When fluorine was added in amounts not within a critical range (4 wt. %, Catalyst "D" and 0 wt. %, Catalyst "E") there resulted marked decreases in catalyst stability indicated by the increased deactivation rates. Catalyst "D", "C" and "E" all containing alumina, demonstrated the same activity or better than the reference commercial catalyst.

EXAMPLE III

The present Example also describes the preparation and testing of the catalytic composites of the present invention. In particular, a vacuum gas oil possessing the properties as set out in Example I was used to evaluate the hydrocracking activity and selectivity of the invention catalysts. The gas oil was processed at 1 LHSV 2,000 psig and 12,000 SCFB recycle gas. The reference commercially available silica-alumina based catalyst described above was assigned an arbitrary relative activity value of 100. The relative activity of the other tested composites is then determined in relation to the relative activity of the reference catalyst as a function of initial temperature required to produce the desired 650° F.-product with a greater than 100 value indicating a superior activity and a lesser than 100 value indicating an inferior activity than that of the reference. The catalytic composites of the present invention were compared with the reference value on the basis of relative activity. The catalytic composites were prepared substantially as set forth in Example I and II above. It should also be noted that the object of the conversion was to yield 650° F.- material with selectivity for material boiling in the 300° –650° F. range. Selectivity is defined as the wt. % portion of the product boiling below 650° F. within the specified boiling range, in this case 300°–650° F.

Table IV below summarizes the results of the present activity tests.

TABLE IV

| Catalyst | Support | Contents Impregnation Material | Relative Activity | Selectivity 300–650° F. |
|---|---|---|---|---|
| G | 50:50 $Al_2O_3$:$SiO_2$ | 0.6% Ni 6.0% W | 100 | .98 |
| H | 75:25 SiO:$ThO_2$ | 0.6% Ni 6.0% W | 84 | .90 |
| I | 77:23 $SiO_2$:$ThO_2$ | 0.6% Ni 6.0% W 2% F | 115 | .89 |
| J | 68:20:12 $SiO_2$:$ThO_2$:$Al_2O_3$ | 0.6% Ni 6.0% W 2% F | 141 | .88 |

The data in Table IV shows that the introduction of fluorine (Catalyst "I") and alumina (Catalyst "J") greatly enhance the hydrocracking activity of the invention catalytic composites as compared to the reference commercial catalyst, or a catalyst containing only silica-thoria in the carrier, Catalyst "H". The substantial increase in activity offsets the decrease in selectivity.

We claim as our invention:

1. A process for the hydrocracking of a hydrocarbon charge stock which comprises reacting the charge stock with hydrogen at hydrocarbon hydrocracking conversion conditions wherein said hydrocarbon hydrocracking conversion conditions include a temperature from about 500° F. to about 1000° F., a pressure from about 500 to about 3000 psig, a liquid hourly space velocity from about 0.2 to about 15 and a hydrogen circulation rate from about 500 to about 20,000 standard cubic feet per barrel of hydrocarbon charge and in contact with a catalytic composite comprising a silica-thoria carrier material wherein said carrier is cogelled silica-thoria containing from about 25% to about 99% by weight silica and from about 1% to about 75% by weight thoria and on an elemental basis about 0.5 to 14 wt. % Group VIB metal component, about 0.5 to 2 wt. % Group VIII metal component, and 1.0 to 3.0 wt. % of a fluorine component.

2. The process of claim 1 wherein the Group VIII metal is nickel, and the Group VIB metal is tungsten.

3. The process of claim 1 wherein the carrier also contains from about 1 to about 25% by weight alumina.

4. A process for the hydrocracking of a hydrocarbon charge stock characterized in that said charge stock is contacted at hydrocracking conditions with a catalyst composite comprising a combination of nickel component, a tungsten component, and a fluorine component with a silica-thoria-alumina carrier material wherein the carrier comprises from about 25% to about 99% by weight silica, from about 75% to about 1% by weight thoria, and from about 1% to about 25% by weight alumina, and wherein the nickel, tungsten, and fluorine components are present in amounts sufficient to result in the composite containing, on an elemental basis, about 0.5% to about 2% by weight of the nickel component, about 0.5% to about 14% by weight of the tungsten component, and about 1% to 3% by weight fluorine.

* * * * *